R. L. TAYLOR.
Harrows.

No. 142,593.

Patented September 9, 1873.

WITNESSES
Wm. H. Dennis.
Jno. D. Patten

Reuben L. Taylor
By his Atty. J. Dennis Jr.

UNITED STATES PATENT OFFICE.

REUBEN L. TAYLOR, OF GOLDEN PRAIRIE, IOWA.

IMPROVEMENT IN HARROWS.

Specification forming part of Letters Patent No. 142,593, dated September 9, 1873; application filed July 2, 1873.

*To all whom it may concern:*

Be it known that I, REUBEN LINCOLN TAYLOR, of Golden Prairie, Delaware county, in the State of Iowa, have invented certain new and useful Improvements in Harrows; and I hereby declare the following to be a full and exact description thereof, reference being had to the accompanying drawings forming part of this specification.

The nature or essence of my invention consists in the particular construction, combination, and arrangement of devices forming the improved harrow described in the following specification and represented in the accompanying drawings, in which—

Figure 1:
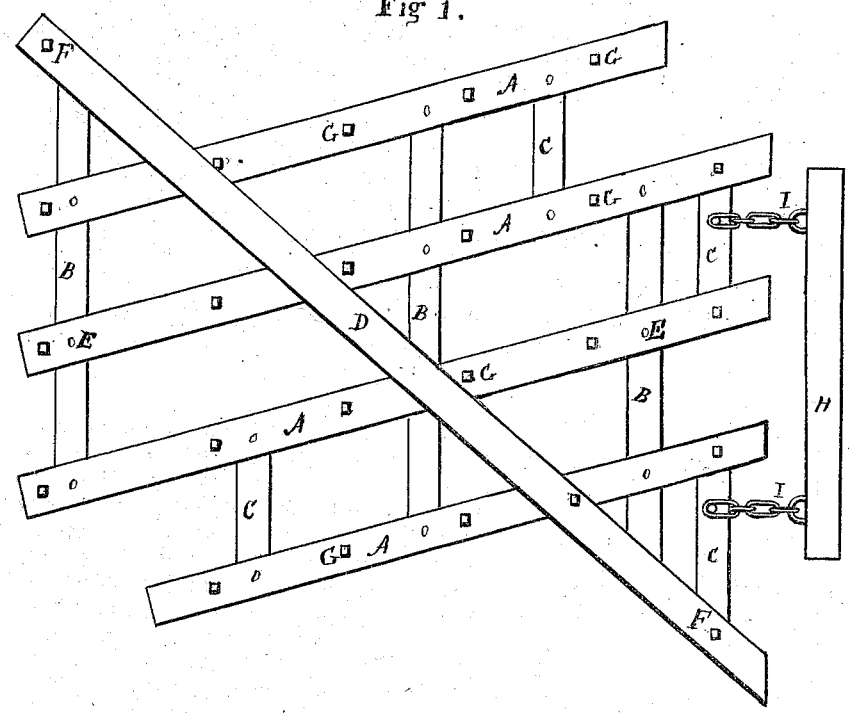
Figure 2:
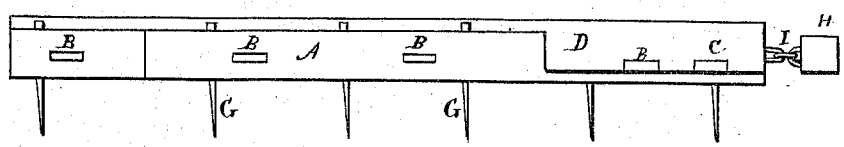

Figure 1 is a plan of the top, and Fig. 2 an elevation of one side, of the harrow.

In the drawing, A A A A are the four main bars, which are mortised diagonally to receive the cross-bars B B B and the short bars C C C C, all of which are inserted in the mortises, and pins E E put through to hold the whole firmly together in the form shown in Fig. 1; and to further strengthen the whole and make room for more teeth, I put the main diagonal bar D across the four main bars A, and cut scores in all the main bars and the diagonal bar, and hold them together, and put in bolts or pins to hold the whole firmly together, as shown in the drawing. This diagonal bar D extends over at each end beyond the main bars, to carry the teeth F F beyond or outside of the teeth in the main bars. The cross-bars B and C and the rear bar B are all fastened to the main diagonal bar D. The teeth in this harrow are arranged as shown by the letters G G, and are found to scratch and pulverize the ground most thoroughly. The outside bars A A are cut short at the opposite corners diagonally, as shown in the drawing. The draft-bar H is connected by chains I I to the short front bars C C, to draw the harrow regularly and uniformly.

What I claim as my invention and improvement in the above-described harrow is—

The combination and arrangement of the main bars A A, diagonal cross-bars B B, with the short bars C C and the main diagonal bar D, carrying teeth at each end, substantially as described.

REUBEN LINCOLN TAYLOR.

Witnesses:
R. W. TIRRILL,
C. D. CLARK.